Sept. 1, 1936.  E. ROSE  2,053,166
ELECTROMAGNETIC BRAKE
Filed Aug. 28, 1935  3 Sheets-Sheet 1

Eugene Rose,
INVENTOR
BY Victor J. Evans & Co.
ATTORNEY

Sept. 1, 1936.                    E. ROSE                    2,053,166
                          ELECTROMAGNETIC BRAKE
                          Filed Aug. 28, 1935            3 Sheets-Sheet 2
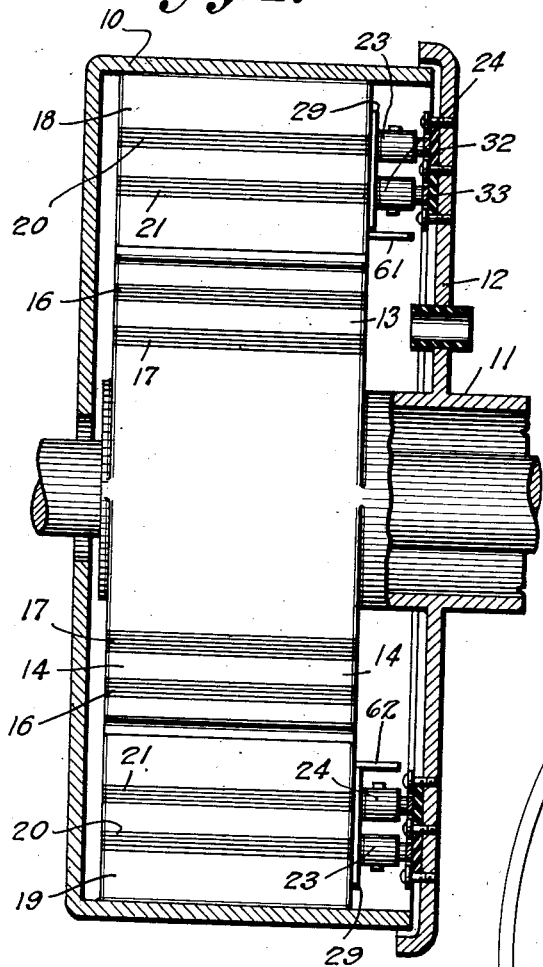
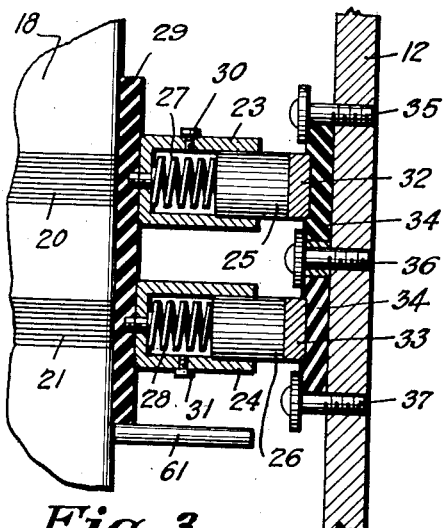
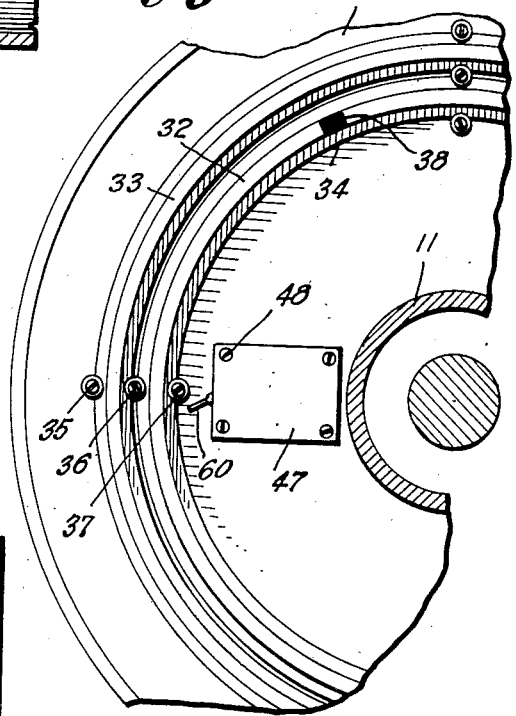
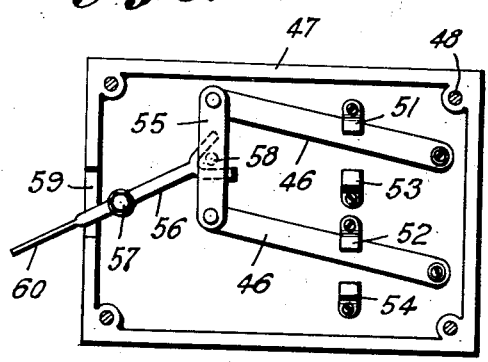
Eugene Rose,
INVENTOR
BY Victor J. Evans & Co.
ATTORNEY Sept. 1, 1936.　　　　　　　E. ROSE　　　　　　　2,053,166
ELECTROMAGNETIC BRAKE
Filed Aug. 28, 1935　　　　　3 Sheets-Sheet 3

*Eugene Rose,*
INVENTOR
BY *Victor J. Evans & Co.*
ATTORNEY

Patented Sept. 1, 1936

2,053,166

UNITED STATES PATENT OFFICE 2,053,166

ELECTROMAGNETIC BRAKE

Eugene Rose, Clarksburg, W. Va.

Application August 28, 1935, Serial No. 38,317

6 Claims. (Cl. 188—104)

This invention relates to brakes of the types that depend on the drag of magnetic forces to stop rotation of a movable part.

An object of the invention is to provide a practical brake in which the polarity of the magnets on the brake drum is reversed one or more times during each cycle so that a quicker response, with smaller current drain, will be obtained than hitherto obtainable in magnetic brakes.

A further object is to provide a novel switch for automatically reversing the direction of the exciting current when the direction of the rotating part is reversed, as for instance, when backing an automobile, so that the driver may devote his entire attention to driving.

A further object is to provide a brake of this type which will be formed of a few strong, simple and durable parts, which will be inexpensive to manufacture, and which will not easily get out of order.

With the above and other objects in view the invention consists of certain novel details of construction and combination of parts hereinafter fully described and claimed, it being understood that various modifications may be resorted to within the scope of the appended claims without departing from the spirit or sacrificing any of the advantages of the invention.

In the accompanying drawings forming part of this specification,

Figure 2 is a cross sectional view taken on the line 2—2 of Figure 1.

Figure 3 is an enlarged detail sectional view of the brushes and contact rings.

Figure 4 is a fragmentary elevation of the flanged brake housing with parts in section and showing the reversing switch.

Figure 5 is a front elevation of the reversing switch with the switch box cover removed.

Figure 1:
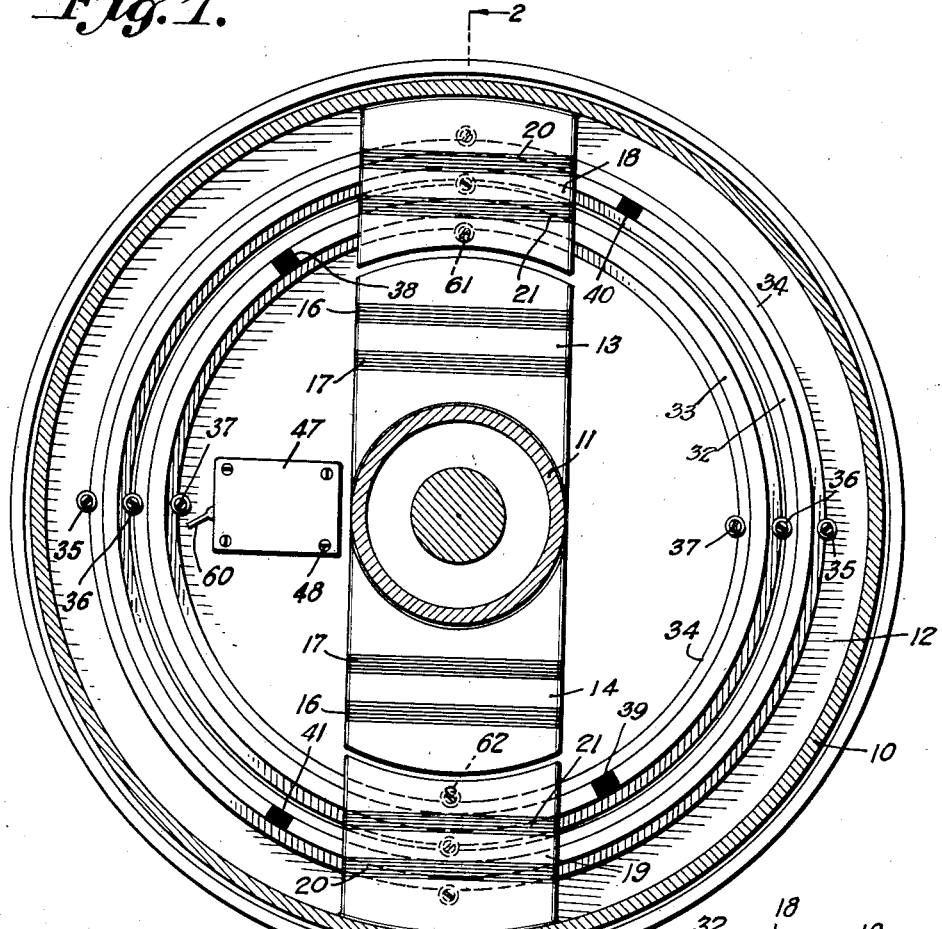
Figure 1 is a vertical sectional view through the brake drum and housing of an automobile wheel showing the electro-magnetic brake mechanism applied thereto.

Referring now to the drawings in which like characters of reference designate similar parts in the various views, 10 designates the brake drum, 11 the axle housing, and 12 the stationary flange of a conventional automobile wheel. In carrying out the invention the stationary housing 11 is provided with a pair of electro-magnet cores 13 and 14 which extend radially from the housing and are provided preferably with dove tail circumferential grooves 15 to receive the coils 16 and 17 which are connected together at the inner ends to form a single coil on each pole piece. A pair of electro-magnet cores 18 and 19 are mounted on the drum 10 and project radially therefrom, these cores being provided with respective coils 20 and 21 which are likewise connected together to form a single coil on each core.

The outer ends of the coils on the cores carried by the drum are connected to terminals 23 and 24 which constitute holders for carbon brushes 25 and 26. Helical springs 27 and 28 are confined in the holders in the rear of the brushes and urge the brushes constantly outward. The holders are insulated from the magnet core by a plate 29 of insulated material which is fixed to the core in any preferred manner. The ends of the coils 20 and 21 may be secured to the holders by means of screws 30 and 31.

A pair of metal contact rings 32 and 33 are disposed concentrically on the stationary flange 12 of the axle housing and are insulated therefrom by respective rings 34 of insulating material secured to the flange at diametrically opposite points by means of screws 35, 36 and 37. The contact ring 32 is divided at two diametrically opposite points, near the pole pieces, to provide gaps which are filled with insulating spacers 38 and 39 over which the brushes wipe when passing from one section to the other section of the ring. Likewise the contact ring 33 is divided at two diametrically opposite points, near the pole pieces, to provide gaps which are filled with insulating spacers 40 and 41. The pole piece 18 is centered between the spacers 38 and 40 while the pole piece 19 is centered between the spacers 39 and 41 whenever the rotating drum magnets align with the stationary magnets on the axle housing for a purpose which will now be explained.

Figure 9:
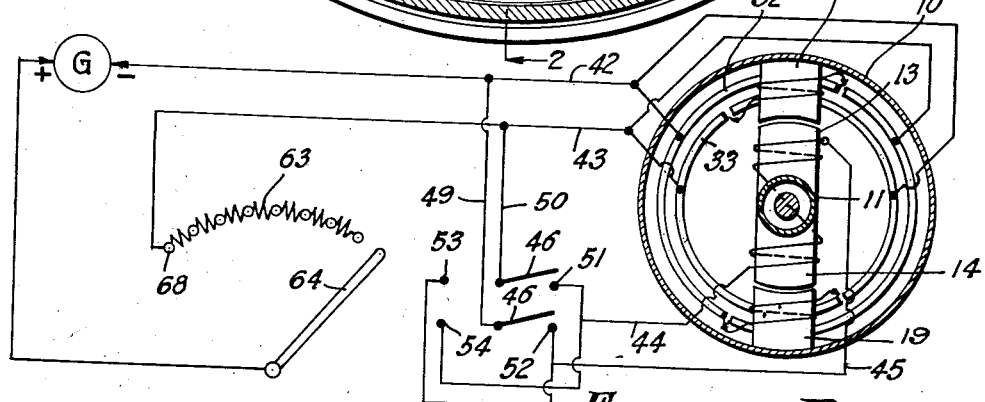
Figure 9 is a diagrammatic view showing the wiring of the magnetic brake and control apparatus.
Figure 6:
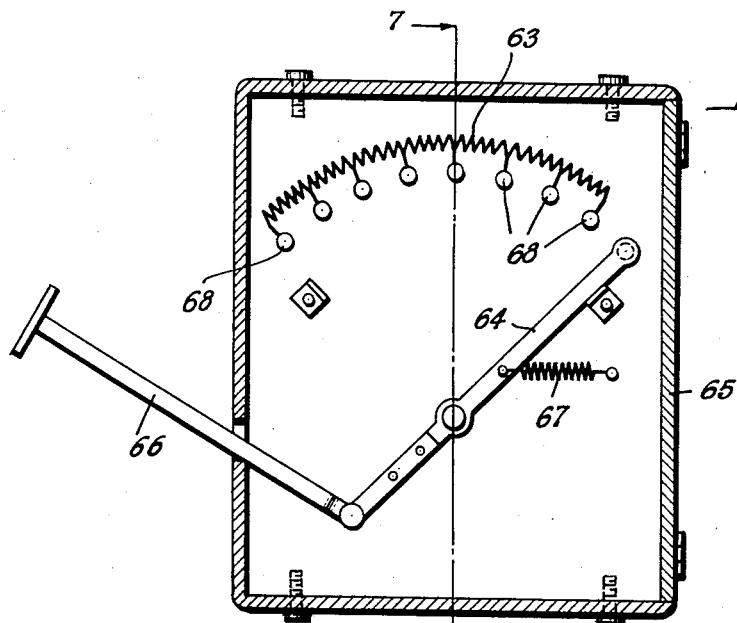
Figure 6 is a front elevation of the rheostat for varying the exciting current.
Figure 7:
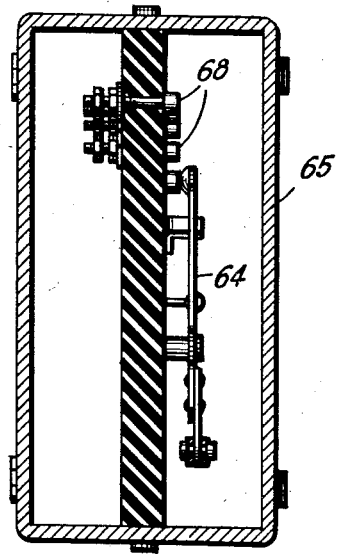
Figure 7 is a vertical sectional view taken on the line 7—7 of Figure 6.

As best shown in Figure 9 the exciting current from the generator is conducted through wires 42 and 43 to the contact rings 32 and 33 in such manner that one of the semicircular sections of each ring will be positive and the other negative. Each time the brushes 25 and 26 pass from one pair of the contact ring sections to the other pair of ring sections the direction of current flow through the drum magnets is reversed and the polarity of the magnets correspondingly reversed.

Figure 10:
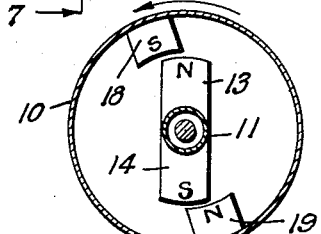
Figure 10 is a diagrammatic view showing opposite polarity of the drum magnets with respect to the housing magnets to produce braking torque.
Figure 11:
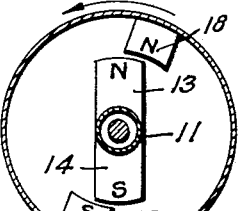
Figure 11 is a diagrammatic view showing the drum magnets having the same polarity as the housing magnets to produce braking torque.
Figure 8:
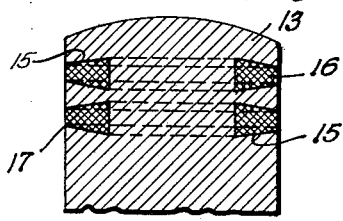
Figure 8 is a fragmentary sectional view of one of the electro-magnets.

The coils of the stationary magnets 13 and 14 on the housing are connected by wires 44 and 45 to the source of current. The coils of the drum magnets 18 and 19 are wound and connected to the brushes in such manner, and the spaces between the ring sections are so located, that the drum magnets will be of opposite polarity to the housing magnets during one half of each cycle and of the same polarity as the housing magnets during the succeeding half cycle. Thus the drum magnets will be of different polarity than the housing magnets as the drum magnets recede from the latter as shown in Figure 10, whereby the magnets tend to attract each other and produce braking torque. The drum magnets will be of the same polarity as the housing magnets when the former approach the latter, as shown in Figure 11, whereby the magnets tend to repel each other and again produce braking torque. By controlling the amount of current through the coils of the magnets the braking torque can be made strong or weak.

In operation attraction between the drum and housing magnets repels the drum opposite to the direction of rotation, and repulsion between the drum magnets and housing magnets repels the drum in a direction opposite to the direction of rotation. When the brushes ride on to the insulating spacers between sections of the rings, the exciting current of the drum magnets is momentarily broken and the braking torque is correspondingly suspended. When the brushes ride off of the insulating spacers and again make contact with the sections of the rings braking torque is again produced to repel the drum. The braking torque will be at maximum twice during each cycle of the drum and will be repeated until the drum stops or until the current is no longer applied to the windings of the magnets.

While only two pairs of magnets are illustrated, one pair on the housing, or stationary part, and the other on the drum or movable part, the scope of the invention includes any desired number of pairs of magnets to produce a predetermined number of periods during which the braking effect will be at maximum intensity in each cycle.

When the direction of the rotation of the drum 10 is changed, as for example when backing the automobile, it is desirable that the direction of current flow through the stationary housing magnets 13 and 14 be automatically reversed. To accomplish this a two pole double throw switch designated in general by the numeral 46 is mounted in a switch box 47 which is fixed to the flange 12 by screws 48 adjacent to the insulating spacers 38 and 40. The blades of the switch are connected by wires 49 and 50 to the feed wires 42 and 43 and are selectively engageable with switch contacts 51 and 52 or switch contacts 53 and 54 which reverse the direction of current flow through the wires 44 and 45 which supply the coils of the stationary housing magnets 13 and 14. The blades are pivotally connected at the outer ends to the switch box and at the inner ends are connected together by a link 55. A forked lever 56 is pivotally connected to the switch box, as shown at 57, and the forked end of the lever receives a pin 58 carried by the link. The free end of the lever projects through an opening 59 in the switch box, and the walls of the opening limit throw of the lever. The outer end 60 of the lever is formed of resilient material.

Disposed on the drum magnet cores 18 and 19 are pins 61 and 62 which impinge against the resilient end 60 of the lever 56, the resilient end yielding to let the pins override the lever during continuous rotation of the drum in one direction. However, when the direction of rotation is reversed, as for instance when backing an automobile, the lever will be intercepted by one of the pins and swung to its opposite limit of movement to reverse the switch blades 46 to reverse the direction of current flow through the stationary housing magnets 13 and 14. It will be noted that one master switch of the type described may be employed to control the direction of flow through the housing magnets of all four wheels of the vehicle.

For varying the circuit resistance of the magnet coils to control the braking action of the coils, a rheostat is employed. The rheostat includes a resistance coil 63 and a pivoted switch contact arm 64, these parts preferably being mounted in a box 65 which is secured to the automobile chassis in proper position so that the switch arm may be operated by a brake pedal 66. The switch arm is controlled by a spring 67 which holds the arm in off position. The arm makes contact progressively with switch contacts 68 which connect sections of the coil 63 in the usual and well known manner. The switch arm 64 and outermost one of the switch contacts 68 are connected in series with the feed wires 42 and 43, as shown in Figure 9.

When the brake pedal is depressed gently the switch arm will move along the contacts 68 and decrease the resistance in the energizing circuits of the electro-magnets so that gentle braking effect is produced. When however the pedal is depressed forcibly the switch arm is moved to the outermost one of the switch contacts 68 thereby cutting out all of the resistance coils 63 and permitting maximum current flow through the magnets to produce positive forceful braking pressure.

From the above description it is thought that the construction and operation of the invention will be fully understood without further explanation.

What is claimed is:

1. In a magnetic brake, a stationary axle housing, a revoluble brake drum, electro-magnets on the housing, electro-magnets on the drum, means for energizing the magnets, and means for reversing the direction of current flow through the drum magnets intermittently during each cycle to reverse polarity of the drum magnets with respect to the housing magnets.

2. In a magnetic brake, a stationary flanged axle housing, a revoluble brake drum, electro-magnets on the housing and on the drum, means for energizing the housing magnets, concentric rings on the flange of the housing divided at diametrically opposite points to form semi-circular sections, brushes forming terminals for the electro-magnets on the drum and engaging said rings, circuit wires for energizing the drum magnets operatively connected to the rings to produce negative potential in one section of each ring and positive potential in the other section of each ring for reversing the polarity of the drum magnets with respect to the housing magnets.

3. In a magnetic brake, a stationary flanged axle housing, a revoluble brake drum, electromagnets on the housing and on the drum, concentric contact rings on the flange of the housing insulated from each other and from the flange, insulated spacers interposed in the rings to provide semi-circular ring sections, brushes forming terminals of the drum magnets and engaging said rings, conductor wires operatively connected to the ring sections to produce positive potential in one section and negative potential in the other section of each ring for reversing polarity of the drum magnets intermittently during each cycle, and conductor wires for energizing the housing magnets.

4. In a magnetic brake, a stationary flanged axle housing, a revoluble brake drum, electromagnets on the housing and on the drum, contact rings on the flange of the housing and insulated therefrom, each ring being formed of a plurality of sections insulated from each other, conductor wires operatively connected to the sections to produce positive potential in one section and negative potential in the other section of each ring, brushes forming terminals of the drum magnets engaging said rings, conductor wires for energizing the housing magnets, and means for reversing the direction of current flow in the housing magnets when the direction of rotation of the drum is reversed.

5. In a magnetic brake, a stationary flanged axle housing, a revoluble brake drum, electromagnets on the housing, electro-magnets on the drum, means for energizing the magnets, means for reversing the direction of current flow through the drum magnets intermittently during each cycle to reverse polarity of the drum magnets with respect to the housing magnets, and a manually controlled resistant member for varying resistance in the coils of the magnets to vary braking action of the magnets.

6. In a magnetic brake, a stationary flanged axle housing, a revoluble brake drum, electromagnets on the housing and on the drum, means for reversing the direction of current flow through the drum magnets intermittently during each cycle, a switch assembled with the flange of the housing for reversing direction of current flow through the housing magnets when the direction of rotation of the drum is reversed, and means assembled with the drum for reversing the switch.

EUGENE ROSE.